US012730314B2

(12) United States Patent
Cho et al.

(10) Patent No.: US 12,730,314 B2

(45) Date of Patent: Sep. 8, 2026

(54) AUTOMATIC EYE HEIGHT ADJUSTMENT

(71) Applicant: HARMAN INTERNATIONAL INDUSTRIES, INCORPORATED, Stamford, CT (US)

(72) Inventors: Kugjin Cho, Seoul (KR); Junghoon Seo, Seoul (KR); Chulmin Lee, Gyeonggi-do (KR); Daehyoun Byoun, Seoul (KR)

(73) Assignee: Harman International Industries, Incorporated, Stamford, CT (US)

(*) Notice: Subject to any disclaimer, the term of this patent is extended or adjusted under 35 U.S.C. 154(b) by 827 days.

(21) Appl. No.: 17/830,930

(22) Filed: Jun. 2, 2022

(65) Prior Publication Data

US 2023/0393396 A1 Dec. 7, 2023

(51) Int. Cl.
*G02B 27/01* (2006.01)

(52) U.S. Cl.
CPC ..... *G02B 27/0149* (2013.01); *G02B 27/0179* (2013.01); *G02B 2027/014* (2013.01); *G02B 2027/0159* (2013.01); *G02B 2027/0163* (2013.01); *G02B 2027/0181* (2013.01); *G02B 2027/0187* (2013.01)

(58) Field of Classification Search
CPC .......... B60K 2360/23; B60K 2360/334; B60K 35/654; B60K 35/53; B60K 35/60; G02B 27/0093–0179; G02B 27/0977; G02B 2027/0129–0187; G06F 3/013; B60R 11/00
USPC ................................ 359/630, 822, 872, 726
See application file for complete search history.

(56) References Cited

U.S. PATENT DOCUMENTS

| | | | | |
|---|---|---|---|---|
| 10,831,021 | B2 * | 11/2020 | Nakamura | G02B 27/0149 |
| 2002/0012173 | A1 | 1/2002 | Aoki et al. | |
| 2003/0021043 | A1 * | 1/2003 | Nakamura | G02B 27/0149 359/872 |
| 2018/0017792 | A1 * | 1/2018 | Takazawa | B60K 35/60 |
| 2019/0011712 | A1 | 1/2019 | Nagano et al. | |
| 2019/0331919 | A1 * | 10/2019 | Huo | H04N 13/344 |
| 2020/0218071 | A1 | 7/2020 | Aoki | |

FOREIGN PATENT DOCUMENTS

| | | | |
|---|---|---|---|
| CN | 112946887 | A | 6/2021 |
| DE | 102013208971 | A1 | 11/2014 |
| DE | 102017130376 | A1 | 6/2019 |
| JP | 2018124575 | A * | 8/2018 |
| WO | WO-2020009218 | A1 * | 1/2020 |
| WO | WO-2020158034 | A1 * | 8/2020 |

* cited by examiner

*Primary Examiner* — Bumsuk Won
*Assistant Examiner* — Samanvitha Sridhar
(74) *Attorney, Agent, or Firm* — Artegis Law Group, LLP

(57) ABSTRACT

Various embodiments include a computer-implemented method comprising determining a height of an eye associated with a user, determining, based on the height of the eye, a target mirror position for a movable mirror to reflect an image on to a reflective surface, wherein the image reflects off of the reflective surface and towards the user at an angle of inclination to reach the user at the height of the eye, the angle of inclination being constant for different heights of the eye, and causing the movable mirror to move to the target mirror position.

16 Claims, 6 Drawing Sheets

600

Acquire Sensor Data 602

Determine Position of Eyebox 604

Determine Target Image Height based on Eyebox 606

Determine Target Mirror Position for Movable Mirror 608

Generate Command to Move the Movable Mirror to the Target Mirror Position 610

Move the Movable Mirror to the Target Mirror Position 612

Project Image Off of the Reflective Surface 614

AUTOMATIC EYE HEIGHT ADJUSTMENT

BACKGROUND

Field of the Various Embodiments

Embodiments of the present disclosure relate generally to augmented reality devices and, more specifically, to techniques for an automatic eye height adjustment.

Description of the Related Art

Vehicles typically include various interfaces to provide information to occupants of the vehicle. For example, a conventional vehicle can include various mechanical and electronic displays that provide information to the driver. These displays are usually integrated into an interior surface of a vehicle and thus require the driver to look away from the windshield, distracting the driver. As a result, some drivers may become fatigued when continually shifting focus between a view of the road through the windshield and a view of the displays in other areas of the vehicle.

To address these issues, some vehicles include systems that provide various types of heads-up displays (HUD). For example, a HUD system may include a projection system that projects a light pattern that includes an image onto a portion of the windshield. The light pattern reflects off of the windshield towards the eyes of the driver. The driver views the reflected light pattern as an image, such as a virtual object located at a position within a three-dimensional space. However, such projection systems may not effectively compensate for the height of the driver when viewing the reflected light pattern.

For example, a projection system may be calibrated to project the image onto the windshield such that the reflected light intersects with a position of an eye of the driver. The projection system can be configured to project the light pattern onto a specific position of the windshield. At this specific position, the light pattern reflects off the windshield, causing the driver to view the image. The projection system can be calibrated to project the light pattern onto the windshield in a manner that the user views the image within a target viewing area within the three-dimensional space. Notably, at times when the driver moves and changes the position of his or her eye, or when a different driver having a different head position uses the vehicle, the projection system calibrated to project a light pattern onto the windshield at the same position results in the reflected light not intersecting the new position of the eye.

Some conventional projection systems include an image height adjustment feature that changes where the projection system projects the light pattern onto the windshield. For example, some projection systems include a rotatable concave mirror that rotates around an axis relative to a fixed mirror. The concave mirror rotates in order to adjust the position at which the light pattern reflects off of the windshield. One drawback with such systems is that the adjustable concave mirror causes the reflected light to reach different eye positions at different angles. For example, the concave mirror can move to a first position such that the projection system projects a light pattern towards the windshield such that the light pattern reflects off of the windshield with a first incidence angle. When the concave mirror rotates to a different orientation, the projection system projects the light pattern towards a different position of the windshield at a different incidence angle. As the reflected light intersects with the eye of the user at a different angle of inclination, the user views the image at a different angle than before. As a result, some drivers may see degraded images. In some instances, the change in the incidence angle can cause drivers of certain heights view the image outside of the target viewing area (e.g., a taller driver may view an image below the target viewing area). In such instances, viewing the image outside of the target viewing area may cause the image to be less effective at conveying the desired information.

Another drawback with conventional projection systems is that the rotatable concave mirror is expensive to produce, limiting how such projection systems can incorporate the movable mirror to change the position at which the projection system projects a light pattern onto the windshield. Further, the rotatable concave mirror requires a large motor to rotate the mirror to the desired orientation. As a result, such projection systems consume large amounts of power, also adding to the costs of adding such projection systems to vehicles.

In light of the above, more effective techniques are needed for adjustable projection systems that make automatic eye height adjustments.

SUMMARY

Various embodiments disclose a computer-implemented method comprising determining a height of an eye associated with a user, determining, based on the height of the eye, a target mirror position for a movable mirror to reflect an image on to a reflective surface, wherein the image reflects off of the reflective surface and towards the user at an angle of inclination to reach the user at the height of the eye, the angle of inclination being constant for different heights of the eye, and causing the movable mirror to move to the target mirror position.

Further embodiments provide, among other things, non-transitory computer-readable storage media storing instructions for implementing the method set forth above, as well as a system configured to implement the method set forth above.

At least one technological advantage of the disclosed approach relative to the prior art is that, with the disclosed techniques, a HUD unit can effectively adjust the projection of an image based on the height of a driver without modifying the angle at which the image intersects with the eyes of drivers of different heights. The disclosed techniques additionally use smaller and less expensive mirrors that can be moved using smaller actuation mechanisms, which consume less power. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
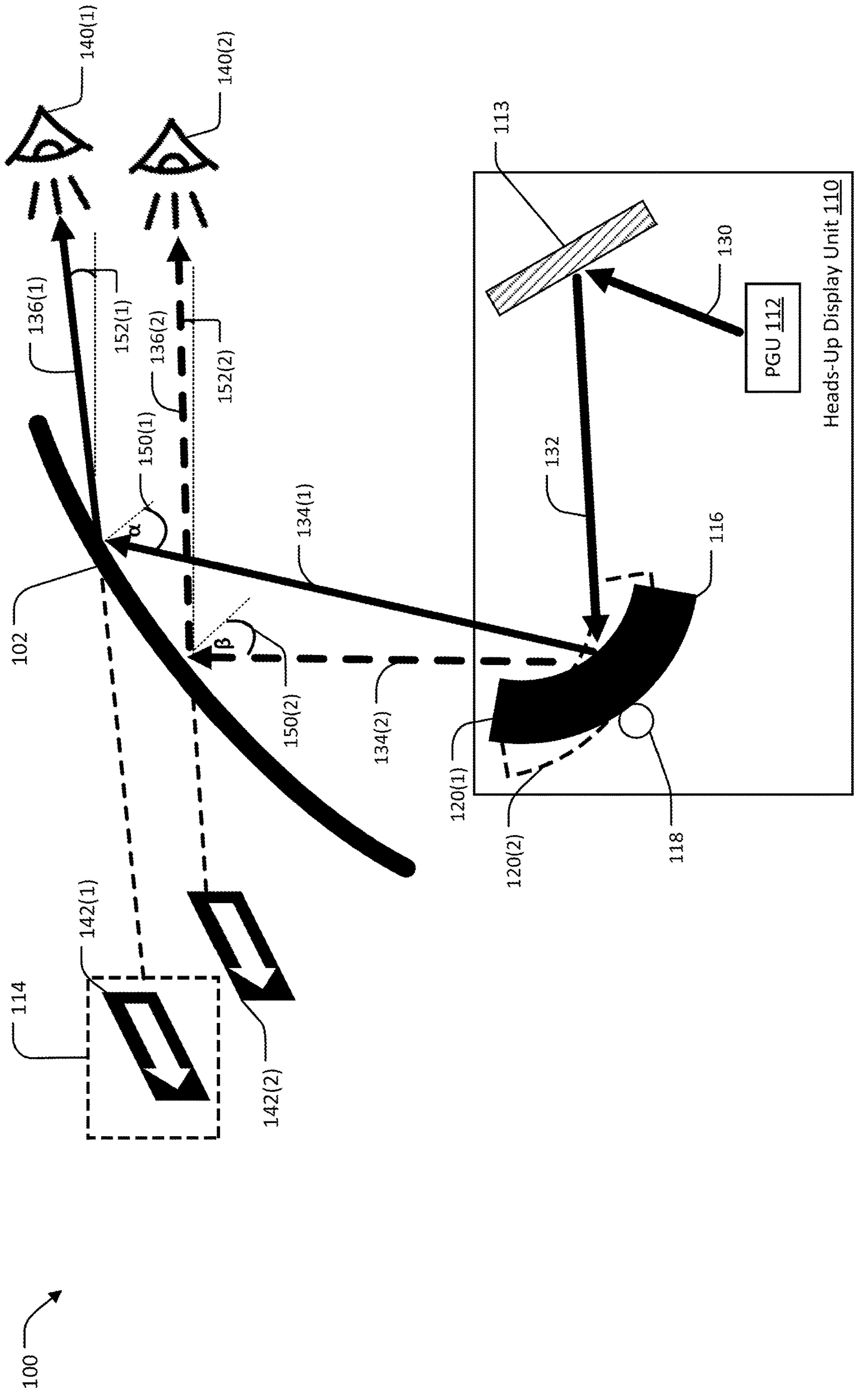
FIG. 1 is a schematic diagram illustrating a prior art image projection system.

In the following description, numerous specific details are set forth to provide a more thorough understanding of the various embodiments. However, it will be apparent to one skilled in the art that the inventive concepts may be practiced without one or more of these specific details.

Overview

Embodiments disclosed herein include an image projection system that includes an image height control module that monitors the position of the eyes of a user of a vehicle. The image height control module adjusts the position that a heads-up display (HUD) unit projects an image in order for the image to reach the eyes of the user and the user to view the image at a target viewing position. The image projection system includes one or more position trackers that determine the eye positions of a user. The position trackers can include interior-facing cameras that acquire sensor data, such as captured images of the eyes of the user. The image height control module processes the acquired sensor data to determine the eye positions of the user. The eye positions can include the relative height(s) of the eyes compared to a reference point, such as a top edge of the windshield or the roof of the vehicle. The image height control module determines a target mirror position for a movable mirror included in the HUD unit based on the determined eye positions. The target mirror position corresponds to the position within the HUD unit at which the movable mirror reflects the image to intersect with a reflective surface (e.g., a windshield in a vehicle) so that the resulting images is viewable at within a target viewing area.

For example, the image height control unit can first determine a target image height, where the target image height is the height corresponding to the position on the reflective surface at which the image reflects off of the reflective surface so as to reach the user at the determined eye positions. Upon determining the target image height, the image height control module determines a target mirror position for the movable mirror. Upon determining the target mirror position, the image height control module generates a command that causes an actuation mechanism to move the movable mirror to the target mirror position. In some embodiments, the actuation mechanism can move a flat mirror along a linear path to reach the target mirror position while the mirror maintains a constant angle relative to one or more other fixed mirrors.

When the movable mirror is at the target mirror position, the HUD unit can project the image using a set of mirrors, including the movable mirror. The image reflects off the reflective surface at the target image height and reaches the user at the determined eye positions. The user sees the projected image as a virtual image through the windshield. When the user changes his or her eye positions, the image height control module determines the new eye position and causes the movable mirror to move to a new target mirror position. At the new target mirror position, the movable mirror causes the HUD unit to project the image onto the reflective surface so that it reflects off the reflective surface and reaches the new eye positions at the same angle of inclination.

The image projection system can be implemented in various forms of augmented reality systems, such as spatial augmented reality systems, vehicles, physical rooms, personal computers, and so forth. The image projection system can perform its processing functions using a dedicated processing device and/or a separate computing device, such as a mobile computing device of a user or a cloud computing system. The image projection system can detect the eye position of a user using any number of position tracking sensors, which can be attached to, integrated with other system components, or disposed separately.

System Overview

FIG. 1 is a schematic diagram illustrating a prior art image projection system 100. As shown the image projection system 100 includes a reflective surface 102, and a heads-up display (HUD) unit 110. The HUD unit 110 includes a picture generation unit (PGU) 112, a fixed mirror 113, a rotatable concave mirror 116, and an actuation mechanism 118.

In operation, the HUD unit 110 operates the actuation mechanism 118 to rotate the rotatable concave mirror 116 into a particular orientation 120. When the rotatable concave mirror 116 is rotated to given orientation 120 (e.g., a first orientation 120(1)), the PGU 112 generates a light pattern 130 that includes an image. The light pattern 130 reflects off of the fixed mirror 113 as light pattern 132. The light pattern 132 reflects off of the rotatable concave mirror 116 as the light pattern 134 (e.g., 134(1)) and reflects off of the reflective surface 102. A given light pattern 134 reflects off of the reflective surface 102 as the light pattern 136 (e.g., 136(1)) and reaches the eye 140 that is located at a specific height. The light pattern 136 includes a virtual image 142 that the user views at a distance away from the reflective surface 102.

The reflective surface 102 can be a surface that reflects various light patterns. The reflective surface 102 can be a transparent surface, such as a windshield of a vehicle. The reflective surface can be a translucent or opaque surface, such as dedicated mirror or display surface. The reflective surface 102 can reflect light in a manner that causes a user to view the images at specific positions.

A given light pattern can reflect off of the reflective surface at a specific incidence angle. The first light pattern 134(1) can reach the reflective surface 102 at a first incidence angle 150(1) (denoted as "$\alpha$") and reflect off the reflective surface 102 at a corresponding reflection angle. The first light pattern 136(1) traverses from the reflective surface 102 to the eye 140 at a first angle of inclination 152(1). In some embodiments, a look-down angle at which the user views the image can be based on the angle of inclination 152. For example, the first light pattern 134(1) can reflect off of the reflective surface 102 as the light pattern 136(1) having a first angle of inclination 152(1). In such instances, the light pattern 136(1) can intersect an eye 140 (e.g., the first eye 140(1)) at the angle of inclination 152(1) and the user can view a virtual image at a first look-down angle based on the first angle of inclination.

To accommodate users of different heights, the HUD unit 110 moves the rotatable concave mirror 116 in order to cause the light pattern 136 to reach the eye 140 at a different height. For example, upon determining that the eye 140 of the user has moved to a different height, or when a different user has his or her eyes 140 located at the different height (e.g., the eye 140(2)), the HUD unit 110 can cause the actuation mechanism 118 to rotate the rotatable concave mirror 116 from the first orientation 120(1) to a second orientation 120(2).

When the rotatable concave mirror 116 is at the second orientation 120(1), the light pattern 132 reflects off of the rotatable concave mirror 116 as the light pattern 134(2) at a different angle and reaches the reflective surface 102 at a different position. The light pattern 134(2) the reflective surface at a different incidence angle 150(2) (denoted as "β") reaches 102 and reflects off of as the light pattern 136(2). The light pattern 136(2) has a different angle of inclination and reaches the eye 140(2) at a different angle of inclination. As a result, the user views the image at a different look-down angle.

Accordingly, the HUD unit 110 of the prior art image projection system 100 can result in the user viewing an image in ways that are not intended, as the HUD unit 110 projects a light pattern to different positions on reflective surface 102 at different incidence angles 150, causing a user to view the image 142 included in the light pattern 136 at different look-down angles and thus view certain images outside of an intended viewing area 114. Further, as discussed above, the rotatable concave mirror 116 and the corresponding actuation mechanism 118 can be large, expensive, and can require large amounts of power to rotate.

Figure 2:
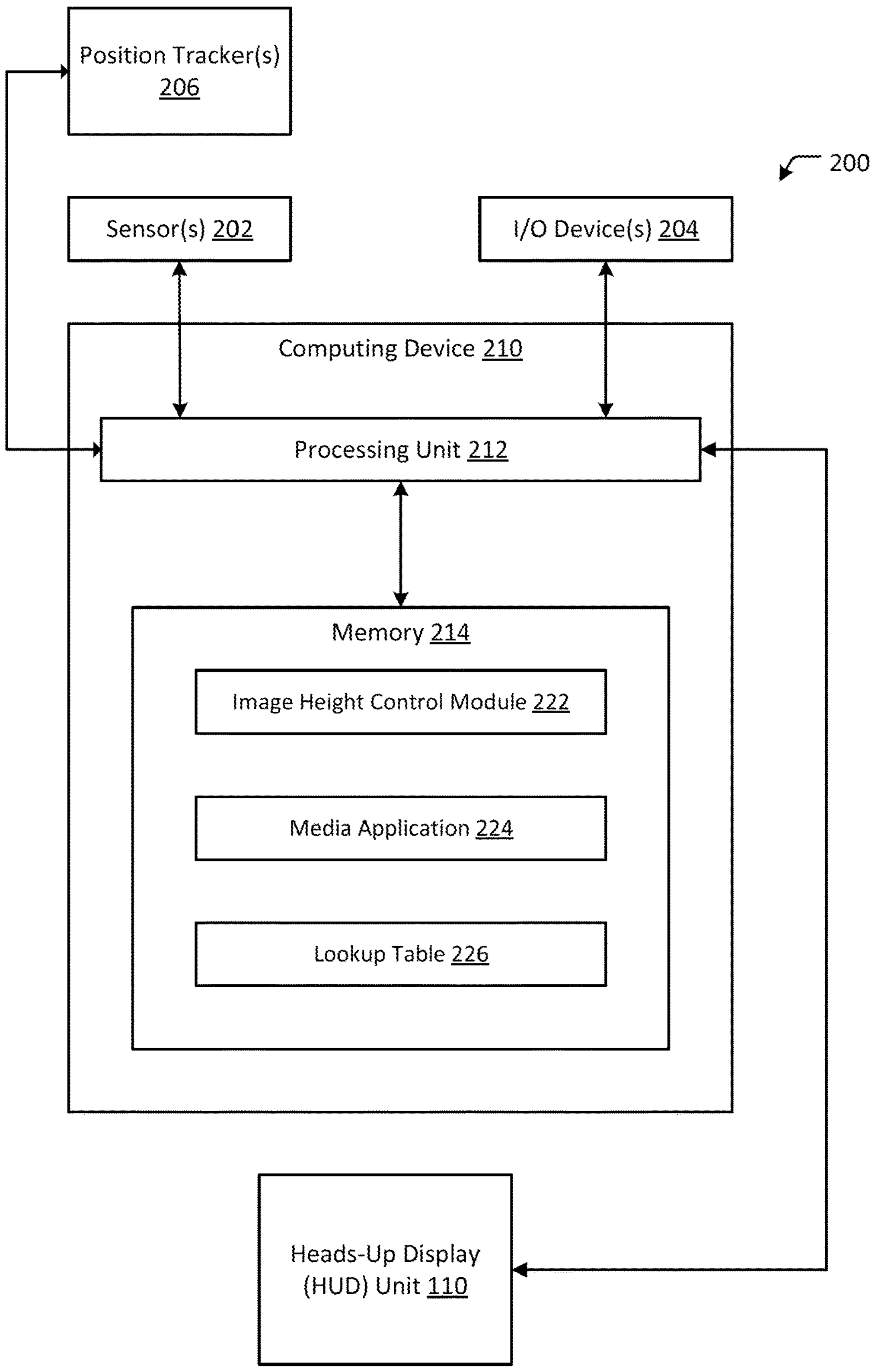
FIG. 2 is a conceptual block diagram of an image projection system configured to implement one or more aspects of the present disclosure.

FIG. 2 is a conceptual block diagram of an image projection system 200 configured to implement one or more aspects of the present disclosure. As shown, and without limitation, the image projection system 200 includes the HUD unit 110, the computing device 210, sensor(s) 202, input/output (I/O) device(s) 204, and position tracker(s) 206. The computing device 210 includes, without limitation, a processing unit 212 and a memory 214. The memory 214 includes, without limitation, an image height control module 222, a media application 224, and a lookup table (LUT) 226.

The computing device 210 can include the processing unit 212 and the memory 214. In various embodiments, the computing device 210 can be a device that includes one or more processing units 212, such as a system-on-a-chip (SoC). In various embodiments, the computing device 210 can be a mobile computing device, such as a tablet computer, mobile phone, media player, and so forth that wirelessly connects to other devices in the vehicle. In some embodiments, the computing device 210 can be a head unit or part of a head unit included in a vehicle system. In some embodiments, the computing device 210 can be split among multiple physical devices in one or more locations. For example, one or more remote devices (e.g., cloud servers, remote services, etc.) can perform one or more aspects of the disclosed techniques, such as eye tracking, media generation, and so forth. Additionally or alternatively, the computing device 210 can be a detachable device that is mounted in a portion of a vehicle as part of an individual console. Generally, the computing device 210 can be configured to coordinate the overall operation of the image projection system 200. The embodiments disclosed herein contemplate any technically-feasible system configured to implement the functionality of the image projection system 200 via the computing device 210. The functionality and techniques of the image projection system 200 are also applicable to other types of vehicles, including consumer vehicles, commercial trucks, airplanes, helicopters, spaceships, boats, submarines, and so forth.

The processing unit 212 can include one or more central processing units (CPUs), digital signal processing units (DSPs), microprocessors, application-specific integrated circuits (ASICs), neural processing units (NPUs), graphics processing units (GPUs), field-programmable gate arrays (FPGAs), and so forth. The processing unit 212 generally includes a programmable processor that executes program instructions to manipulate input data and generate outputs. In some embodiments, the processing unit 212 can include any number of processing cores, memories, and other modules for facilitating program execution. For example, the processing unit 212 could receive inputs, such as sensor data from the position trackers 206, and/or inputs from a user via the input devices 204, and can generate pixels for display on an output device 204 (e.g., the HUD unit 110). In some embodiments, the processing unit 212 can be configured to execute the image height control module 222 in order to modify the configuration of the HUD unit 110 when projecting an image.

The memory 214 can include a memory module or collection of memory modules. The memory 214 generally comprises storage chips such as random-access memory (RAM) chips that store application programs and data for processing by the processing unit 212. In various embodiments, the memory 214 can include non-volatile memory, such as optical drives, magnetic drives, flash drives, or other storage. In some embodiments, separate data stores, connected via a network ("cloud storage") can connect to the image height control module 222 and/or the media application 224. The image height control module 222 and the media application 224 within the memory 214 can be executed by the processing unit 212 in order to implement the overall functionality of the computing device 210 and, thus, coordinate the operation of the image projection system 100 as a whole.

The image height control module 222 is configured to manage the operation of the image projection system 200. In some embodiments, the image height control module 222 is configured to receive sensor data from the position trackers 206 and/or the sensors 202. The image height control module 222 can process the sensor data and determine the positions of the eyes 140 of a user and determine a target image height. The target image height can correspond to a height on the reflective surface at which the HUD unit 110 is to project a light pattern 134 such that projected light pattern 134 reflects off of the reflective surface 102 and intersects with the eyes 140 at the determined eye positions. In various embodiments, the image height control module 222 generates a command that causes the HUD unit 110 to adjust one or more components and project the light pattern 134 in a manner that the light pattern 134 reflects off of the reflective surface 102 at the target image height.

In various embodiments, the image height control module 222 can determine a target mirror position for movable mirror included in the HUD unit 110. The target mirror position corresponds to a position of the movable mirror that causes a light pattern 132 within the HUD unit 110 to reflect off of the movable mirror and reach the reflective surface 102 at the target image height. Upon determining the target mirror position that corresponds to the target image height, the image height control module 222 can generate a command that causes an actuation mechanism to move the movable mirror to the target mirror position.

The media application 224 can be an application that provides image data to the HUD unit. In various embodiments, the media application 224 can provide the image data to the PGU 112 included in the HUD unit 110. In such instances, the PGU 112 can generate a light pattern 130 that includes image included in the image data. In various embodiments, the media application 224 can receive the image data from one or more other applications. For example, the media application can generate image data that includes information provided by other applications or subsystems, such as navigation data from a navigation subsystem and/or content item information from an entertainment subsystem.

The LUT 226 can store a table that includes entries that map specific heights of an eye 140 to target image heights and/or target mirror positions. In various embodiments, the computing device 210, the HUD unit 110, and/or other devices can acquire data determined by using the HUD unit 110 to display images using the movable mirror and recording the image heights and mirror positions that cause the user to view the images for various heights of eye 140.

In various embodiments, the image height control module 222 can refer to LUT 226 with one value to find an entry that includes other corresponding values. For example, the image height control module 222 can, upon determining the position of the eye 140, search the LUT 226 for an entry containing the specific height and/or other coordinates for the position of the eye 140. Upon locating the entry for the position of the eye 140, the image height control module 222 can identify the corresponding target mirror position for the movable mirror. In some embodiments, the image height control module 222 can use different values to retrieve corresponding values from the LUT 226. For example, the image height control module 222 can compute the target image height. The image height control module 222 can then use the LUT 226 to find an entry for the computed target image height to identify a corresponding target mirror position.

In some embodiments, the image height control module 222 can compute the target mirror position. For example, the image height control module 222 can compute the target mirror position as a function of the eye height of the eye 140 (e.g., $Position_M$=f(eye height)). in such instances, the image height control module 222 can determine the target mirror position without using the LUT 226.

The I/O devices 204 includes at least one device capable of both receiving input, such as a keyboard, a mouse, a touch-sensitive screen, a microphone, and gesture sensing imager, and so forth, as well as devices capable of providing output, such as a display screen, loudspeakers (including a loudspeaker associated with a headphone-based system), and the like. The display screen can be separate from the virtual display provided by the HUD unit 110 projecting the light pattern 136. The display screen may be external to the image projection system 100, such as a computer monitor, an infotainment display screen of the vehicle, a display apparatus incorporated into a separate handheld device, or any other technically-feasible display screen.

In some embodiments, the sensors 202 can include gesture sensors. In such instances, a user input can be implemented by the user manipulating AR objects presented to the user. For example, in such embodiments, AR objects can be swiped away, grabbed, or otherwise moved, via user gestures. The gesture sensors can be incorporated into the display area provided by the HUD unit 110, and/or integrated into one or more interior surfaces of the vehicle. Additionally or alternatively, in some embodiments, gesture sensing is combined with the position trackers 206. In some embodiments, the sensors 202 can include camera-based sensors, such as an infra-red (IR), or red-green-blue (RGB), or RGB depth camera.

The position tracker(s) 206 can include one or more sensors and/or computer devices that track the position of the user. In various embodiments, the position trackers 206 can be vehicle interior-facing cameras that acquire image data within a field of view that include the eyes 140 of the user. In such instances, position tracker 206 can provide the acquired image data to the image height control module 222. In some embodiments, the position trackers 206 can provide the image data to a separate module (not shown) that determine the position of the eyes 140 and generates tracking data that indicate the position of the eyes 140. For example, the image height control module 222 or the separate module can convert the acquired image data into an eyebox at a specific height representing the position of the eye 140.

Automatic Image Adjustment

Figure 3:
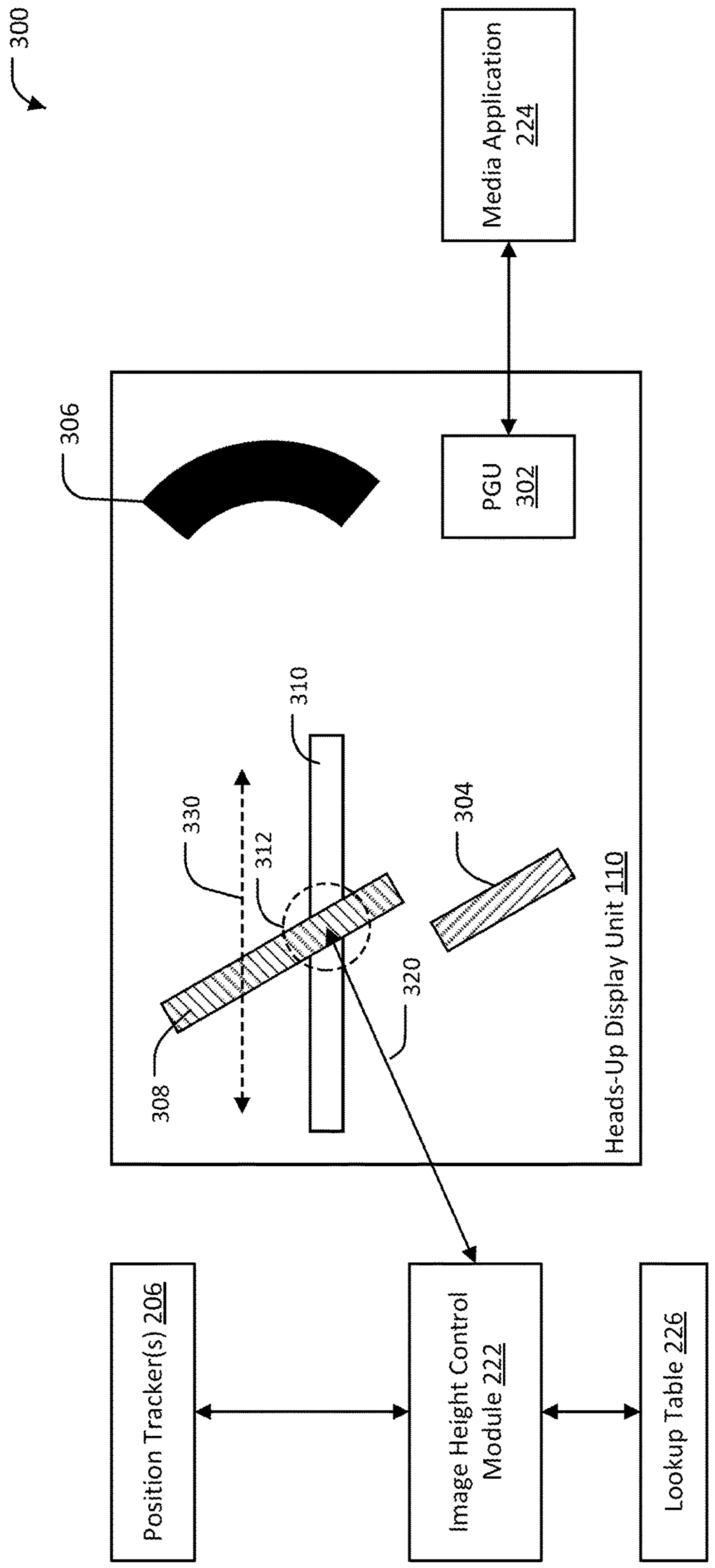
FIG. 3 is a schematic diagram illustrating portions of a heads-up display unit in the image projection system of FIG. 2, according to various embodiments of the present disclosure.

FIG. 3 is a schematic diagram illustrating portions of a heads-up display unit 110 in the image projection system 200 of FIG. 2, according to various embodiments of the present disclosure. As shown, and without limitation, the image projection system 300 includes the position trackers 206, the HUD unit 110, the image height control module 222, the lookup table 226, and the media application 224. The HUD unit 110 includes, without limitation, a picture generation unit (PGU) 302, a stationary flat mirror 304, a stationary concave mirror 306, a movable mirror 308, a track 310, and a connection point 312.

In operation, the image height control module 222 processes sensor data from the position trackers 206 and determines a position of a given eye 140. The image height control module 222 determines a target mirror position for the movable mirror 308 that is based on the determined height of the eye 140. For example, the image height control module 222 can refer to the lookup table 226 to determine the specific target mirror position that corresponds to the determined eye height. The image height control module 222 generates a command or signal 320 that triggers an actuation mechanism that causes the movable mirror 308 to move along the track 310 in a linear movement 330 that moves the movable mirror 308 to the target mirror position. For example, the command or signal 320 can provide a set point for a control unit used to control the position of movable mirror 308. When the movable mirror 308 is located at the target mirror position, the media application 224 provides image data for the PGU 302 to produce. The PGU 302 generates a light pattern that includes the image. The light pattern that reflects off the set of mirrors 304, 306, 308 and the HUD unit 110 provides the light pattern that reaches the reflective surface at the target image height.

In various embodiments, the HUD unit 110 can include a set of mirrors, such as the stationary flat mirror 304, the stationary concave mirror 306, and the movable mirror 308, to reflect the light pattern 130 generated by the PGU 302 so that it is emitted from the HUD unit 110 in a desired direction. In some embodiments, the HUD unit 110 can include more or fewer mirrors. For example, in some embodiments, the HUD unit 110 can include the PGU 302 projecting an image directly towards the movable mirror 308.

In various embodiments, the movable mirror 308 can be a flat mirror that is angled relative to a plane of the reflective surface 102, the plane of the stationary concave mirror 306, and/or the plane of the track 310. For example, the movable mirror 308 can have an orientation that is 45° relative to the plane of the track 310 and/or 90° relative to the plane of the reflective surface 102. In various embodiments, the movable mirror 308 maintains the same orientation, even when moved by the motor. In some embodiments, the movable mirror 308 can have different characteristics than the stationary concave mirror 306. For example, the movable mirror 308 can be a flat mirror that is lighter, smaller, and easier to control than the rotatable concave mirror 116 included in the prior art image projection system 100. In another example, the movable mirror 308 can be cheaper to produce than the rotatable concave mirror 116.

In some embodiments, the movable mirror 308 can be coupled to the actuation mechanism at a connection point 312. In such instances, various types of connectors (e.g., adhesives, mechanical connectors, magnetic connectors, etc.) can connect the movable mirror 308 to the actuation mechanism and transfer the mechanical force that the actuation mechanism generates. In various embodiments, the actuation mechanism can be a motor, linear actuator, solenoid, shock, strut, jack, slotted screw, servos, worm gear, and/or other types of mechanisms that can cause the movable mirror 308 to linearly move along the track 310. For example, the actuation mechanism can be a motor connected to a belt, and the belt can connect to the movable mirror 308 at the connection point 312. In such instances, the motor can cause the belt to move the movable mirror 308 at the connection point 312 along the track 310. Other types of movement mechanisms (e.g., gears, solenoids, worm gears, looped belts, etc.) can also move the movable mirror 308 along the track 310 and/or move the movable mirror 308 without using a track.

In various embodiments, the actuation mechanism can respond to the command or signal 320 provided by the image height control module 222 to move to the target mirror position. For example, the actuation mechanism can be a linear actuator that responds to the received command by rotating first motor and causing a second motor to move linearly and cause the movable mirror 308 to engage in a linear movement 330 to reach the target position indicated in the command or signal 320. In some embodiments, the actuation mechanism, track 310, and/or connection point 312 can be smaller than the actuation mechanism 118 used to rotate the rotatable concave mirror 116. For example, a motor included in the actuation mechanism to move the movable mirror 308 can be smaller than the actuation mechanism 118 due to the movable mirror 308 being lighter and smaller than the rotatable concave mirror 116. In such instances, the actuation mechanism can consume less power to move the movable mirror 308, as compared to moving the rotatable concave mirror 116.

In some embodiments, the actuation mechanism controls the movable mirror 308 by moving the movable mirror 308 to within a desired tolerance of the target mirror position, such as within 0.1 mm of the target mirror position. Additionally, or alternatively, the actuation mechanism can continually receive commands or signals 320 from the image height control module 222 that correspond to the user continually changing his or her eye position. In such instances, the actuation mechanism can execute a series of motions that cause the movable mirror 308 to make a series of linear movements 330 along the track 310 to reach the different target mirror positions.

Figure 4:
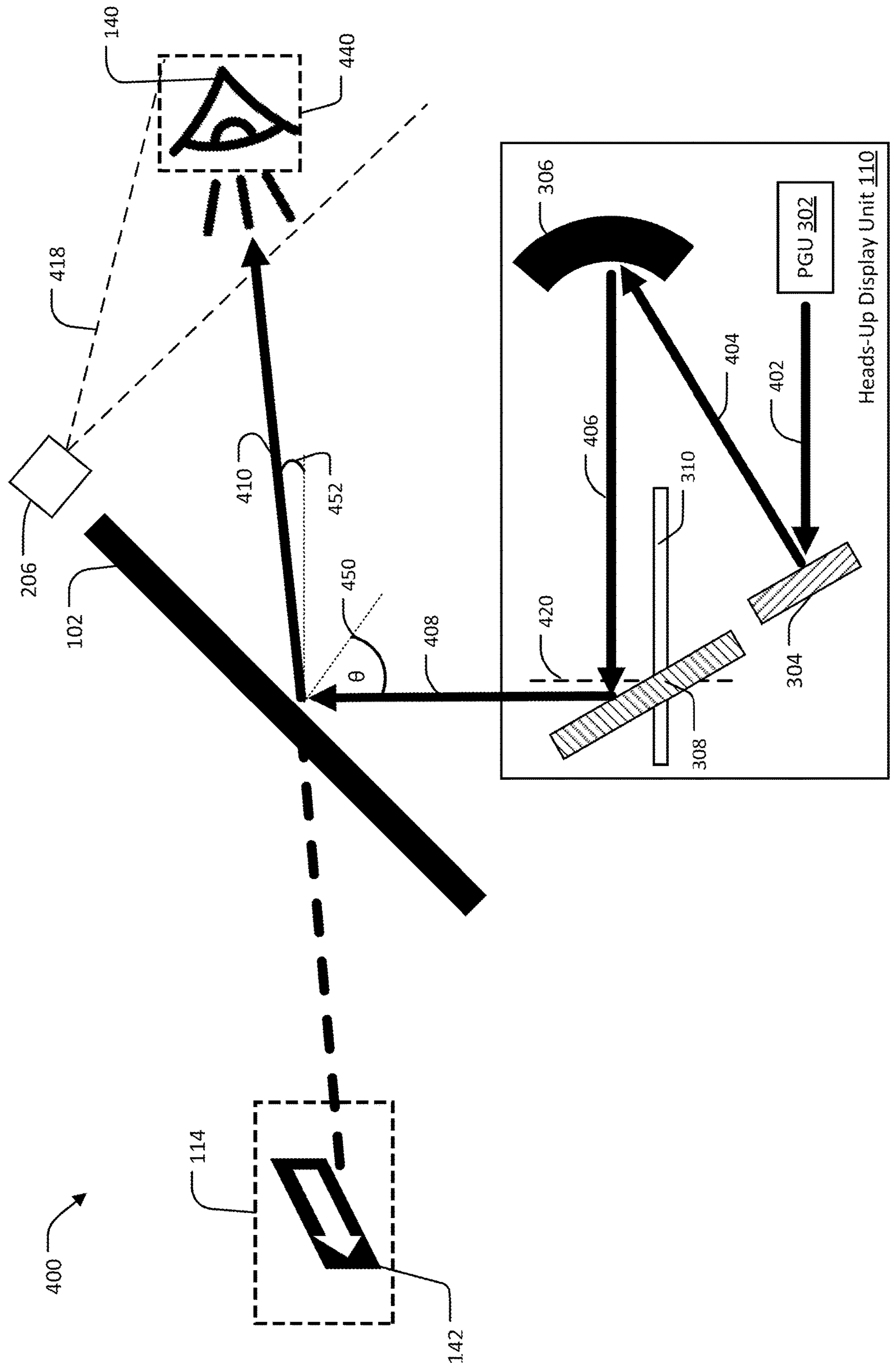
FIG. 4 is a diagram of the image projection system of FIG. 2 operating to project an image at a first image height, according to various embodiments of the present disclosure.

FIG. 4 is a diagram 400 of the image projection system 200 of FIG. 2 operating to project an image at a first image height, according to various embodiments of the present disclosure. As shown, and without limitation, the image projection system 200 includes the heads-up unit 110 and the reflective surface 102. The heads-up display unit 110 includes, without limitation, the PGU 302, the stationary flat mirror 304, the stationary concave mirror 306, the movable mirror 308, and the track 310.

In various embodiments, the position tracker 206 acquires sensor data for objects within the field of view 418. The image height control module 222 can use the acquired sensor data to determine an eyebox 440 that represents the eye position 160(1) of the user. In such instances, the image height control module 222 can determine the target viewing area 114 in which the virtual image 142 is to be displayed. Additionally or alternatively, the image height control module 222 can determine a target mirror position 420 that would cause the HUD unit 110 to emit the light pattern 408 that reaches reflective surface 102 at the target image height. The light pattern 408 reaches the reflective surface 102 at an incidence angle 450 (denoted as "θ") and reflects off of the reflective surface 102 as the light pattern 410 at a reflection angle. The light pattern 410 has an angle of inclination 452 and reaches the eyebox 440 along the angle of inclination 452. In such instances, the target image height causes the user to see the using a look-down angle based on the angle of inclination, where the user views the virtual image 142 within the target viewing area 114. Upon determining the target mirror position 420, the image height control module 222 generates a command or signal 320 for the actuation mechanism to move the movable mirror 308 to the target mirror position 420.

The actuation mechanism responds to the received command or signal 320 by moving the movable mirror 308 along the track 310 to the mirror position 420. For example, the actuation mechanism can use the received command or signal 320 as a set point for a position control unit used to control a motor or other actuator. The movable mirror 308 maintains a constant angle relative to the track 310. The PGU 302 produces a light pattern 402 that travels to the stationary flat mirror 304. The light pattern 402 reflects off of the stationary flat mirror 304 as the light pattern 404. The light pattern 404 reflects off of the stationary concave mirror 306 as the light pattern 406. The light pattern 406 reflects off of the movable mirror 308 at the mirror position 420 and traverses to the reflective surface 102 at the incidence angle 450 as the light pattern 408. The light pattern 408 reflects off of the reflective surface 102 as the light pattern 410 reaches the eye 140. The user views the light pattern 410 in a manner that causes the user to perceive the virtual image 142 provided by the PGU 302 within the target viewing area 114.

Figure 5:
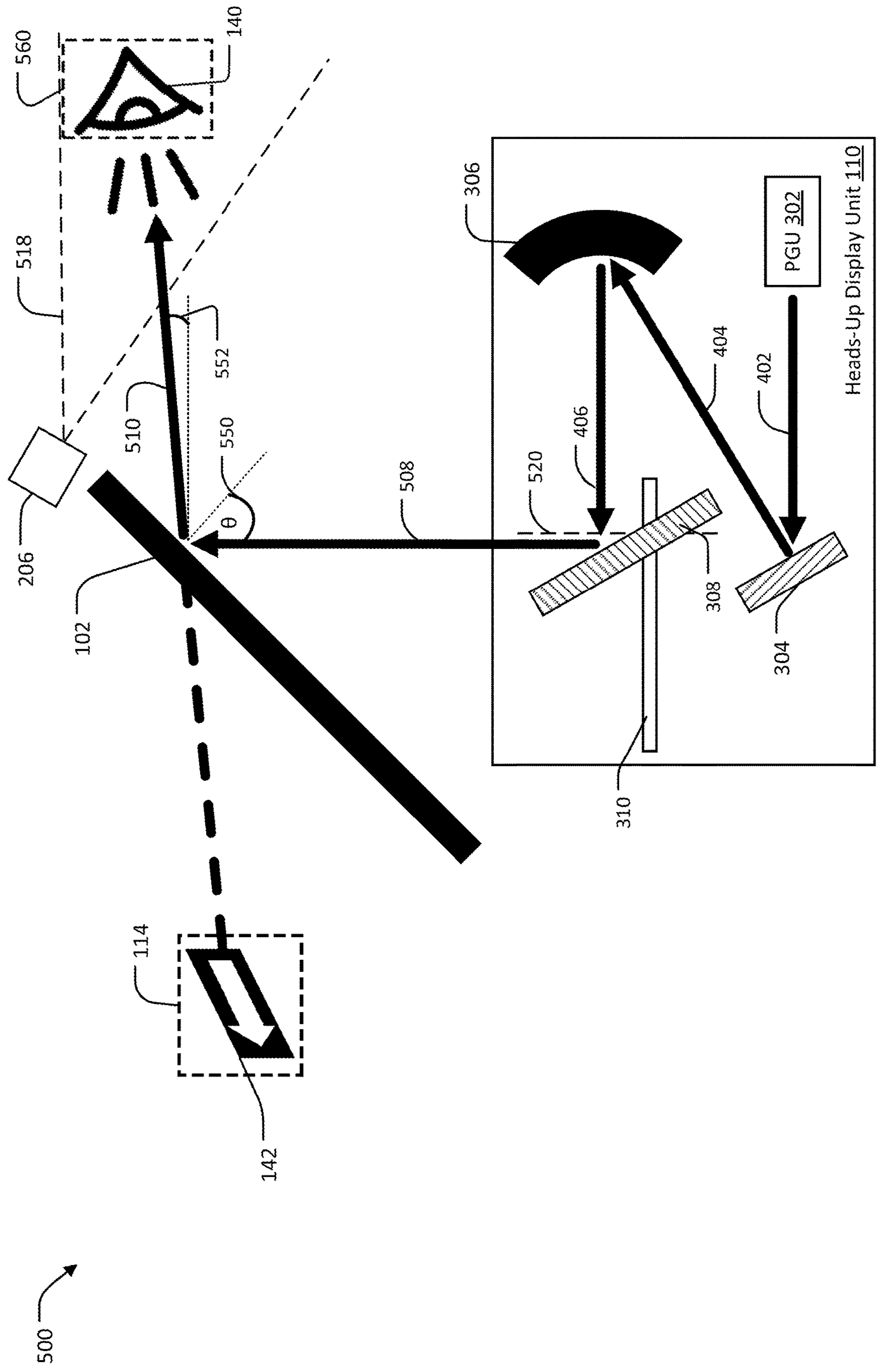
FIG. 5 is a diagram of the image projection system of FIG. 2 operating to project an image at a second image height, according to various embodiments of the present disclosure.

FIG. 5 is a diagram 500 of the image projection system 200 of FIG. 2 operating to project an image at a second image height, according to various embodiments of the present disclosure. In operation, the position tracker 206 acquires sensor data within the field of view 518, including the eye 140 of the user positioned at a different height.

In various embodiments, the image height control module 222 can determine that the user has a different eye position that corresponds to the user viewing the reflective surface 102 at a different height. In some embodiments, the image height control module 222 can determine the change in height for the eye position as an absolute value. Alternatively, in some embodiments, the image height control module 222 can determine the change in height for the eye position in relation to a fixed point, such as a roof of the vehicle, the base of the reflective surface 102, etc. Upon determining the new eye position, the image height control module 222 can determine an updated eyebox 560 representing the eye 140. The image height control module 222 can use the eyebox to determine an updated target height and/or an updated target viewing area 114 for the user to see the virtual image 142.

Upon determining the updated target image height, the image height control module 222 can determine an updated target mirror position 520 that corresponds to the updated target image height. In such instances, the image height control module 222 can generate a new command or signal 320 that causes the actuation mechanism to move the movable mirror 308 to the updated mirror position 520. The actuation mechanism responds to the new command or signal 320 by moving the movable mirror 308 along the track 310 to the updated mirror position 520, where the movable mirror 308 maintains the same angle relative to the track 310 and the stationary concave mirror 306. The PGU 302, the stationary flat mirror 304, and the stationary concave mirror 306 similarly reflect the light patterns 402, 404. The movable mirror 308 at the updated mirror position 520 reflect the light pattern 406 as the light pattern 508.

As the updated mirror position 520 is in a different position along a linear plane relative to the mirror position 420, the light pattern 508 reaches the reflective surface 102 at a different position. Further, as the movable mirror 308 maintains the same angle relative to the stationary concave mirror 306, the light pattern 508 can reach the reflective surface 102 at an incidence angle 550 that is equivalent to the previous incidence angle 450. In such instances, the light pattern 508 can reflect off of the reflective surface 102 as the light pattern 510 at the same reflection angle. In various embodiments, the light pattern 510 can have the angle of inclination 552. The light pattern 510 can thus reach the eye 140 at the same angle of inclination as the light pattern 410 and the user can view the virtual image 142 using the same look-down angle. In some embodiments, the target viewing area 114 can be changed based on the eye position. In such instances, the user can perceive the virtual image 142 within the updated target viewing area 114.

Figure 6:
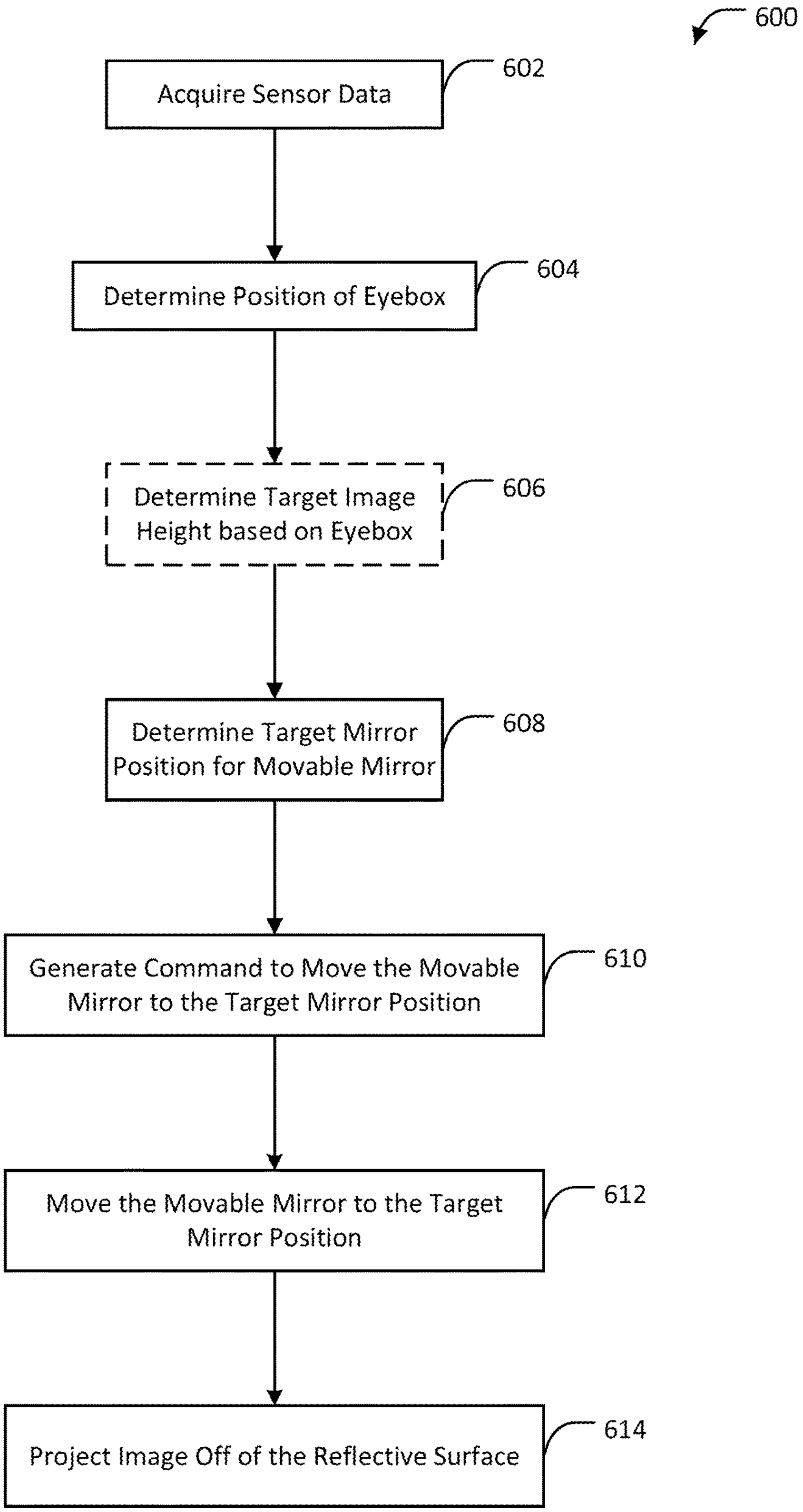
FIG. 6 is a flowchart of method steps for moving a mirror based on the position of a user, according to various embodiments of the present disclosure.

FIG. 6 is a flowchart of method steps for adjusting moving a movable mirror based on the position of a user, according to various embodiments of the present disclosure. Although the method steps are described with reference to the embodiments of FIGS. 1-5, persons skilled in the art will understand that any system configured to implement the method steps, in any order, falls within the scope of the present disclosure.

As shown in FIG. 6, the method 600 begins at step 602, where the image height control module 222 acquires sensor data associated with positions of the eyes 140 of the user. In various embodiments, the image height control module 222 included in the image projection system 100 can receive sensor data from one or more position trackers 206, where the sensor data includes information indicating the eye position. For example, the position trackers 206 can acquire various image data, auditory data, and so forth.

At step 604, the image height control module 222 can determine the position of the eyebox 162. In various embodiments, the image height control module 222 can process the acquired sensor data to determine the eye position of the user. For example, the image height control module 222 can process image data provided by the position trackers 206 to determine the coordinates for the eyes 140 of the user. In such instances, the image height control module 222 can generate an eyebox 440 that represents the eye position.

At step 606, the image height control module 222 can optionally determines a target image height based on the eyebox 440. In various embodiments, the image height control module 222 can use the position of the eyebox 440 to determine a target image height. The target image height corresponds to the height at which a light pattern reflects off of the reflective surface 102 and intersect with the eyebox 440 at the determined eye position. In some embodiments, the target image height can be based on an angle that the user uses to view the target viewing area 114.

At step 608, the image height control module 222 determines the target mirror position for a movable mirror. In various embodiments, the image height control module 222 can determine a target mirror position for a movable mirror 308 included in a HUD unit 110. For example, the target mirror position can correspond to the position of the movable mirror 308 that causes the HUD unit 110 to project the light pattern so that it reaches the reflective surface at the target image height. In some embodiments, the image height control module 222 can determine the target mirror position upon determining the target image height. Alternatively, in some embodiments, the image height control module 222 can determine the target mirror position directly from the position of the eyebox. For example, the image height control module 222 can compute the target mirror position as a function of the height of the eyebox.

Additionally or alternatively, in some embodiments, the image height control module 222 can refer to the LUT 226 to determine the target mirror position. In such instances, the image height control module 222 can obtain the target mirror position from the lookup table 226 based on the position of the eyebox or the target image height.

At step 610, the image height control module 222 causes a motor or other actuator to move the movable mirror 308 to the determined mirror position. In various embodiments, the image height control module 222 can generate a command or signal 320 to cause an actuation mechanism to move the movable mirror 308 to the target mirror position.

At step 612, the actuation mechanism moves the movable mirror to the target mirror position. In various embodiments, upon receiving the command or signal 320 to the, the actuation mechanism can respond by linearly moving the movable mirror 308 to the target mirror position. For example, the actuation mechanism can use the received command or signal 320 as a set point for a position control unit used to control a motor or other actuator.

At step 614, the HUD unit 110 projects an image off of the reflective surface 102. In various embodiments, after the movable mirror 308 moved to the target mirror position, the PGU 302 can produce an image by emitting a light pattern 402. The light pattern 402 reflects on a set of mirrors 304, 306, 308, and reflects off the reflective surface 102 at the target image height and reaches the eye 140 of the user. When the user perceives the light pattern, the user can see the image produced by the PGU 302 within the target viewing area 114.

In sum, an image projection system controls the position of a movable mirror to project an image in the form of a light pattern emitted towards to a specific position on a separate reflective surface, such as a windshield, to display the image at a specific height for viewing by the user at specific height. An image height control module 222 included in the image projection system receives sensor data acquired by one or more position trackers. The image height control module processes the acquired sensor data to determine the position of an eyebox representing an eye of the user. The image height control module uses the position of the eyebox to determine a target mirror position for the movable mirror that will cause the HUD unit to project the image at the target image height. In some embodiments, the image height control module can compute the target mirror position for the movable mirror; alternatively, in some embodiments, the image height control module can refer to a lookup table to find an entry for the eyebox position or the target image height that has a corresponding target mirror position. The image height control module generates a command that causes an actuation mechanism connected to the movable mirror to move the movable mirror to the target mirror position.

A picture generation unit included in the HUD unit produces an image by emitting a light pattern. The light pattern off of a set of mirrors that includes the movable mirror, where the movable mirror reflects the light pattern towards the windshield. The windshield reflects the light pattern towards the eyebox. When the eyes of the user receive the light pattern, the user sees the image included in the light pattern through the windshield at the target viewing position. In some embodiments, when the user changes the position of his or her eyes, the image height control module can respond by changing the position of the eyebox, determining a new target mirror position, and generating a new command to move the movable mirror to the new target mirror position.

At least one technological advantage of the disclosed approach relative to the prior art is that, with the disclosed techniques, a HUD unit can effectively adjust the projection of an image based on the height of a driver without modifying the angle at which the image intersects with the eyes of drivers of different heights. The disclosed techniques additionally use smaller and less expensive mirrors that can be moved using smaller actuation mechanisms, which consume less power. These technical advantages provide one or more technological advancements over prior art approaches.

Further, by adjusting the position that the HUD unit projects an image onto the windshield, the image projection system can transmit images that a user sees within a specific target viewing area, enabling a user to view the images through the windshield at positions that are not distracting and do not require the user to change focus.

1. In various embodiments, a computer-implemented method comprises determining a height of an eye associated with a user, determining, based on the height of the eye, a target mirror position for a movable mirror to reflect an image onto a reflective surface, where the image reflects off of the reflective surface and towards the user at an angle of inclination to reach the user at the height of the eye, the angle of inclination being constant for different heights of the eye, and causing the movable mirror to move to the target mirror position.

2. The computer-implemented method of clause 1, where the movable mirror is a flat mirror.

3. The computer-implemented method of clause 1 or 2, further comprising acquiring sensor data associated with the user, determining, based on the acquired sensor data, the height of the eye of the user.

4. The computer-implemented method of any of clauses 1-3, where determining the target mirror position comprises determining, based on the height of the eye, a target image height, and determining, based on the target image height, the target mirror position, wherein the movable mirror at the target mirror position reflects the image to reach the reflective surface at the target image height.

5. The computer-implemented method of any of clauses 1-4, where the movable mirror maintains a constant orientation when moving to the target mirror position.

6. The computer-implemented method of any of clauses 1-5, where the movable mirror moves along a linear path when moving to the target mirror position.

7. The computer-implemented method of any of clauses 1-6, further comprising determining that the eye of the user has moved to a second height, determining, based on the second height, a second target mirror position, and causing the movable mirror to move from the target mirror position to the second target mirror position.

8. The computer-implemented method of any of clauses 1-7, where the movable mirror at the second target mirror position reflects the image on to the reflective surface and the image reflects off of the reflective surface at the angle of inclination to reach the user at the second height of the eye.

9. The computer-implemented method of any of clauses 1-8, where identifying a target mirror position comprises identifying, from a lookup table, an entry mapping the height of the eye of the user to the target mirror position.

10. In various embodiments, a system comprises a movable mirror configured to reflect an image onto a reflective surface, a memory storing an image height control application, and a processor coupled to the memory that executes the image height control application by determining a height of an eye associated with a user, determining, based on the height of the eye, a target mirror position for the movable mirror to reflect the image, wherein the image reflects off of the reflective surface and towards the user at an angle of inclination to reach the user at the height of the eye, the angle of inclination being constant for different heights of the eye, and causing the movable mirror to move to the target mirror position.

11. The system of clause 10, further comprising an actuator, where actuation of the actuator causes the movable mirror to move to the target mirror position, where the actuator comprises at least one of a solenoid, a linear actuator, a motor, or a servo.

12. The system of clause 10 or 11, further comprising a track, where causing the movable mirror to move to the target mirror position comprises actuating the movable mirror to move along the track.

13. The system of any of clauses 10-12, where the track is a linear track.

14. The system of any of clauses 10-13, where the reflective surface comprises a windshield of a vehicle.

15. The system of any of clauses 10-14, further comprising a picture generation unit that generates the image.

16. The system of any of clauses 10-15, where the movable mirror comprises a flat mirror, and the movable mirror maintains a constant orientation when moving to the target mirror position.

17. The system of any of clauses 10-16, where identifying a target mirror position comprises identifying, from a lookup table, an entry mapping the height of the eye of the user to the target mirror position.

18. In various embodiments, one or more non-transitory computer-readable media store instructions that, when executed by one or more processors, cause the one or more processors to perform the steps of determining a height of an eye associated with a user, determining, based on the height of the eye, a target mirror position for a movable mirror to reflect an image onto a reflective surface, where the image reflects off of the reflective surface and towards the user at an angle of inclination to reach the user at the height of the eye, the angle of inclination being constant for different heights of the eye, and causing the movable mirror to move to the target mirror position.

19. The one or more non-transitory computer-readable media of clause 18, where the movable mirror comprises a flat mirror, and the movable mirror maintains a constant orientation when moving to the target mirror position.

20. The one or more non-transitory computer-readable media of clause 18 or 19, the steps further comprising determining that the eye of the user has moved to a second height, determining, based on the second height, a second target mirror position, and causing the movable mirror to move from the target mirror position to the second target mirror position, where the movable mirror at the second target mirror position reflects the image on to the reflective surface, and the image reflects off of the reflective surface at the angle of inclination to reach the user at the second height of the eye.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:

determining a height of an eye associated with a user;

determining, based on the height of the eye, a target mirror position for a movable flat reflective mirror to reflect an image onto a reflective surface, wherein the image reflects off of the reflective surface and towards the user at an angle of inclination to reach the user at the height of the eye, the angle of inclination being constant for different heights of the eye; and causing the movable flat reflective mirror to move linearly relative to a stationary concave mirror and a picture generation unit to the target mirror position, wherein the movable flat reflective mirror maintains a constant angle relative to the stationary concave mirror; and generating, by the picture generation unit based on information associated with the image, a light pattern of the image, wherein the movable flat reflective mirror reflects the image from the stationary concave mirror onto the reflective surface.

2. The computer-implemented method of claim 1, further comprising:

acquiring sensor data associated with the user; and determining, based on the acquired sensor data, the height of the eye of the user.

3. The computer-implemented method of claim 1, wherein determining the target mirror position comprises:

determining, based on the height of the eye, a target image height, and determining, based on the target image height, the target mirror position, wherein the movable flat reflective mirror at the target mirror position reflects the image to reach the reflective surface at the target image height.

4. The computer-implemented method of claim 1, wherein the movable flat reflective mirror moves along a linear path when moving to the target mirror position.

5. The computer-implemented method of claim 1, further comprising:
determining that the eye of the user has moved to a second height;
determining, based on the second height,
a second target mirror position; and
causing the movable flat reflective mirror to move from the target mirror position to the second target mirror position.

6. The computer-implemented method of claim 5, wherein:
the movable flat reflective mirror at the second target mirror position reflects the image on to the reflective surface; and
the image reflects off of the reflective surface at the angle of inclination to reach the user at the second height of the eye.

7. The computer-implemented method of claim 1, wherein determining the target mirror position comprises:
identifying, from a lookup table, an entry mapping the height of the eye of the user to the target mirror position; and
retrieving, from the entry, the target mirror position.

8. A system comprising:
a movable flat reflective mirror configured to reflect an image onto a reflective surface;
a picture generation unit that receives information associated with the image and generates a light pattern of the image;
a memory storing an image height control application; and
a processor coupled to the memory that executes the image height control application to perform steps comprising:
determining a height of an eye associated with a user;
determining, based on the height of the eye, a target mirror position for the movable flat reflective mirror to reflect the image, wherein the image reflects off of the reflective surface and towards the user at an angle of inclination to reach the user at the height of the eye, the angle of inclination being constant for different heights of the eye; and
causing the movable flat reflective mirror to move linearly relative to a stationary concave mirror and the picture generation unit to the target mirror position, wherein:
the movable flat reflective mirror maintains a constant angle relative to the stationary concave mirror, and
the movable flat reflective mirror reflects the image from the stationary concave mirror onto the reflective surface.

9. The system of claim 8, further comprising an actuator, wherein:
actuation of the actuator causes the movable flat reflective mirror to move to the target mirror position, and
the actuator comprises at least one of a solenoid, a linear actuator, a motor, or a servo.

10. The system of claim 9, further comprising a track, wherein causing the movable flat reflective mirror to move to the target mirror position comprises actuating the movable flat reflective mirror to move along the track.

11. The system of claim 10, wherein the track is a linear track.

12. The system of claim 9, wherein the reflective surface comprises a windshield of a vehicle.

13. The system of claim 9, wherein determining the target mirror position comprises:
identifying, from a lookup table, an entry mapping the height of the eye of the user to the target mirror position; and
retrieving, from the entry, the target mirror position.

14. One or more non-transitory computer-readable media storing instructions that, when executed by one or more processors, cause the one or more processors to perform the steps of:
determining a height of an eye associated with a user;
determining, based on the height of the eye, a target mirror position for a movable flat reflective mirror to reflect an image onto a reflective surface, wherein the image reflects off of the reflective surface and towards the user at an angle of inclination to reach the user at the height of the eye, the angle of inclination being constant for different heights of the eye; and
causing the movable flat reflective mirror to move linearly relative to a stationary concave mirror and a picture generation unit to the target mirror position, wherein the movable flat reflective mirror maintains a constant angle relative to the stationary concave mirror; and
generating, by a picture generation unit based on information associated with the image, a light pattern of the image, wherein the movable flat reflective mirror reflects the image from the stationary concave mirror onto the reflective surface.

15. The one or more non-transitory computer-readable media of claim 14, wherein the movable flat reflective mirror comprises a flat mirror, and the movable flat reflective mirror maintains a constant orientation when moving to the target mirror position.

16. The one or more non-transitory computer-readable media of claim 14, the steps further comprising:
determining that the eye of the user has moved to a second height;
determining, based on the second height, a second target mirror position; and
causing the movable flat reflective mirror to move from the target mirror position to the second target mirror position, wherein:
the movable flat reflective mirror at the second target mirror position reflects the image on to the reflective surface; and
the image reflects off of the reflective surface at the angle of inclination to reach the user at the second height of the eye.

* * * * *